United States Patent
Sugaya

(10) Patent No.: US 10,577,776 B2
(45) Date of Patent: Mar. 3, 2020

(54) SHOVEL AND METHOD OF CONTROLLING SHOVEL

(71) Applicant: SUMITOMO(S.H.I.) CONSTRUCTION MACHINERY CO., LTD., Tokyo (JP)

(72) Inventor: Tetsuya Sugaya, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 288 days.

(21) Appl. No.: 15/244,200

(22) Filed: Aug. 23, 2016

(65) Prior Publication Data

US 2016/0356021 A1 Dec. 8, 2016

Related U.S. Application Data

(63) Continuation of application No. PCT/JP2015/053771, filed on Feb. 12, 2015.

(30) Foreign Application Priority Data

Feb. 24, 2014 (JP) .................. 2014-033316

(51) Int. Cl.
*E02F 9/22* (2006.01)
*F02D 29/04* (2006.01)
(Continued)

(52) U.S. Cl.
CPC .......... *E02F 9/2228* (2013.01); *E02F 9/2232* (2013.01); *E02F 9/2235* (2013.01);
(Continued)

(58) Field of Classification Search
CPC ..... E02F 9/2228; E02F 9/2232; E02F 9/2235; E02F 9/2246; E02F 9/2282; E02F 9/2285;
(Continued)

(56) References Cited

U.S. PATENT DOCUMENTS 5,715,790 A * 2/1998 Tolley .................. F02D 31/007
123/396
5,890,468 A * 4/1999 Ozawa .................. F02B 37/005
123/561
(Continued)

FOREIGN PATENT DOCUMENTS

JP H01-224419 9/1989
JP 2001-295674 10/2001
(Continued)

OTHER PUBLICATIONS

International Search Report dated Apr. 28, 2015.

*Primary Examiner* — Nathaniel E Wiehe
*Assistant Examiner* — Richard C Drake
(74) *Attorney, Agent, or Firm* — IPUSA, PLLC

(57) ABSTRACT

A shovel includes a lower traveling body, an upper rotating body mounted on the lower traveling body, an internal-combustion engine including a supercharger and being controlled at a constant revolution speed, a hydraulic pump coupled to the internal-combustion engine, a hydraulic actuator to be driven by a hydraulic oil discharged from the hydraulic pump, a control valve system including multiple flow control valves for controlling a flow of the hydraulic oil discharged from the hydraulic pump, and a controller that controls an absorbing horsepower of the hydraulic pump. The controller is configured to increase a boost pressure of the supercharger before a load is applied to the hydraulic actuator by controlling a specific flow control valve in the control valve system to limit or block the flow of the hydraulic oil discharged from the hydraulic pump and thereby increasing a discharge pressure of the hydraulic pump.

8 Claims, 9 Drawing Sheets

(51) Int. Cl.
  *F15B 21/00* (2006.01)
  *F02D 23/00* (2006.01)
  *E02F 3/32* (2006.01)
(52) U.S. Cl.
  CPC .......... *E02F 9/2246* (2013.01); *E02F 9/2282* (2013.01); *E02F 9/2285* (2013.01); *E02F 9/2292* (2013.01); *E02F 9/2296* (2013.01); *F02D 23/00* (2013.01); *F02D 29/04* (2013.01); *F15B 21/001* (2013.01); *E02F 3/32* (2013.01); *F15B 2211/20523* (2013.01); *F15B 2211/20546* (2013.01); *F15B 2211/6651* (2013.01); *F15B 2211/851* (2013.01); *Y02T 10/144* (2013.01)
(58) Field of Classification Search
  CPC ...... E02F 9/2292; E02F 9/2296; F02D 23/00; F02D 29/04; F15B 21/001
  USPC .......................................................... 60/420
  See application file for complete search history.

(56) References Cited

U.S. PATENT DOCUMENTS

| | | | | | |
|---|---|---|---|---|---|
| 6,010,309 | A | * | 1/2000 | Takamura | E02F 9/2235 417/218 |
| 6,021,756 | A | * | 2/2000 | Nakamura | E02F 9/2235 123/385 |
| 6,378,303 | B1 | * | 4/2002 | Higuchi | E02F 9/2235 60/468 |
| 7,805,937 | B2 | * | 10/2010 | Cochet | F02D 23/00 123/564 |
| 8,726,664 | B2 | * | 5/2014 | Narazaki | E02F 9/2235 60/701 |
| 2006/0166784 | A1 | * | 7/2006 | Tabata | B60K 6/445 477/37 |
| 2007/0028892 | A1 | * | 2/2007 | Schmid | B60W 10/30 123/352 |
| 2009/0293470 | A1 | * | 12/2009 | Tsukamoto | E02F 9/2228 60/459 |
| 2010/0179735 | A1 | * | 7/2010 | Ekvall | B60W 10/103 701/50 |
| 2010/0332088 | A1 | * | 12/2010 | Okano | B60K 25/02 701/50 |
| 2012/0035815 | A1 | * | 2/2012 | Kawashima | B60K 6/48 701/50 |
| 2012/0251332 | A1 | * | 10/2012 | Sohn | E02F 9/2066 417/34 |
| 2013/0195340 | A1 | | 8/2013 | Iwase et al. | |
| 2013/0255243 | A1 | * | 10/2013 | Shiratani | E02F 9/2285 60/420 |
| 2013/0259620 | A1 | * | 10/2013 | Shirao | B60W 30/18172 414/685 |
| 2014/0058607 | A1 | * | 2/2014 | Magaki | E02F 9/2075 701/22 |
| 2014/0165548 | A1 | * | 6/2014 | Satake | E02F 9/2075 60/420 |
| 2014/0239636 | A1 | * | 8/2014 | Sano | H02P 1/00 290/7 |
| 2014/0255212 | A1 | * | 9/2014 | Endo | F04D 25/02 417/34 |
| 2015/0063967 | A1 | * | 3/2015 | Morita | E02F 9/2246 414/685 |
| 2015/0075148 | A1 | * | 3/2015 | Yamaji | F04B 49/06 60/420 |
| 2016/0123354 | A1 | | 5/2016 | Morita | |

FOREIGN PATENT DOCUMENTS

| | | |
|---|---|---|
| JP | 2008-128107 | 6/2008 |
| JP | 2011-241677 | 12/2011 |
| JP | 2013-153884 | 8/2013 |
| JP | 6177913 | 8/2017 |
| WO | 2012/169558 | 12/2012 |

* cited by examiner

SHOVEL AND METHOD OF CONTROLLING SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2015/053771, filed on Feb. 12, 2015 and designated the U.S., which claims priority to Japanese Patent Application No. 2014-033316, filed on Feb. 24, 2014. The entire contents of the foregoing applications are incorporated herein by reference.

BACKGROUND

Technical Field

An aspect of this disclosure relates to a shovel and a method of controlling the shovel.

Description of Related Art

A turbocharger (turbo-supercharger) engine is often used as an engine (internal combustion engine) for a hydraulic shovel. A turbocharger uses an exhaust gas of an engine to rotate a turbine and generate a pressure, and introduces the generated pressure into an induction system of the engine to supercharge the engine and increase the engine power.

When a boom is started to be driven during the operation of a shovel, the hydraulic load increases and the engine load of an engine having been driven at a constant revolution speed also increases. When the engine load increases, to maintain the engine revolution speed, the engine increases the engine power by increasing the charging pressure (boost pressure) and the fuel injection amount.

For example, to quickly respond to an increase in the engine load, a related-art power control device increases the boost pressure of a turbocharger engine and thereby increases the engine power when an operation that may increase the engine load is detected.

SUMMARY

In an aspect of this disclosure, there is provided a shovel that includes a lower traveling body; an upper rotating body mounted on the lower traveling body; an internal-combustion engine that is mounted on the upper rotating body, includes a supercharger, and is controlled at a constant revolution speed; a hydraulic pump coupled to the internal-combustion engine; a hydraulic actuator to be driven by a hydraulic oil discharged from the hydraulic pump; a control valve system including multiple flow control valves for controlling a flow of the hydraulic oil discharged from the hydraulic pump; and a controller that controls an absorbing horsepower of the hydraulic pump. The controller is configured to increase a boost pressure of the supercharger before a load is applied to the hydraulic actuator by controlling a specific flow control valve in the control valve system to limit or block the flow of the hydraulic oil discharged from the hydraulic pump and thereby increasing a discharge pressure of the hydraulic pump.

DETAILED DESCRIPTION

The related-art power control device increases the boost pressure when an increase in the hydraulic load is detected. That is, the related-art power control device increases the boost pressure after the hydraulic load increases to a certain level due to an external force such as an excavation reaction force. Accordingly, in a case where the hydraulic load rapidly increases due to an external force such as an excavation reaction force with respect to the engine power, the related-art power control device cannot increase the boost pressure quickly enough to keep up with the increase in the hydraulic load. This may result in, for example, generation of black smoke due to incomplete combustion of fuel and an engine power shortage, and may further result in an engine stop.

An aspect of this disclosure provides a shovel and a method of controlling the shovel that can increase the boost pressure without delay.

Embodiments of the present invention are described below with reference to the accompanying drawings.

Figure 1:
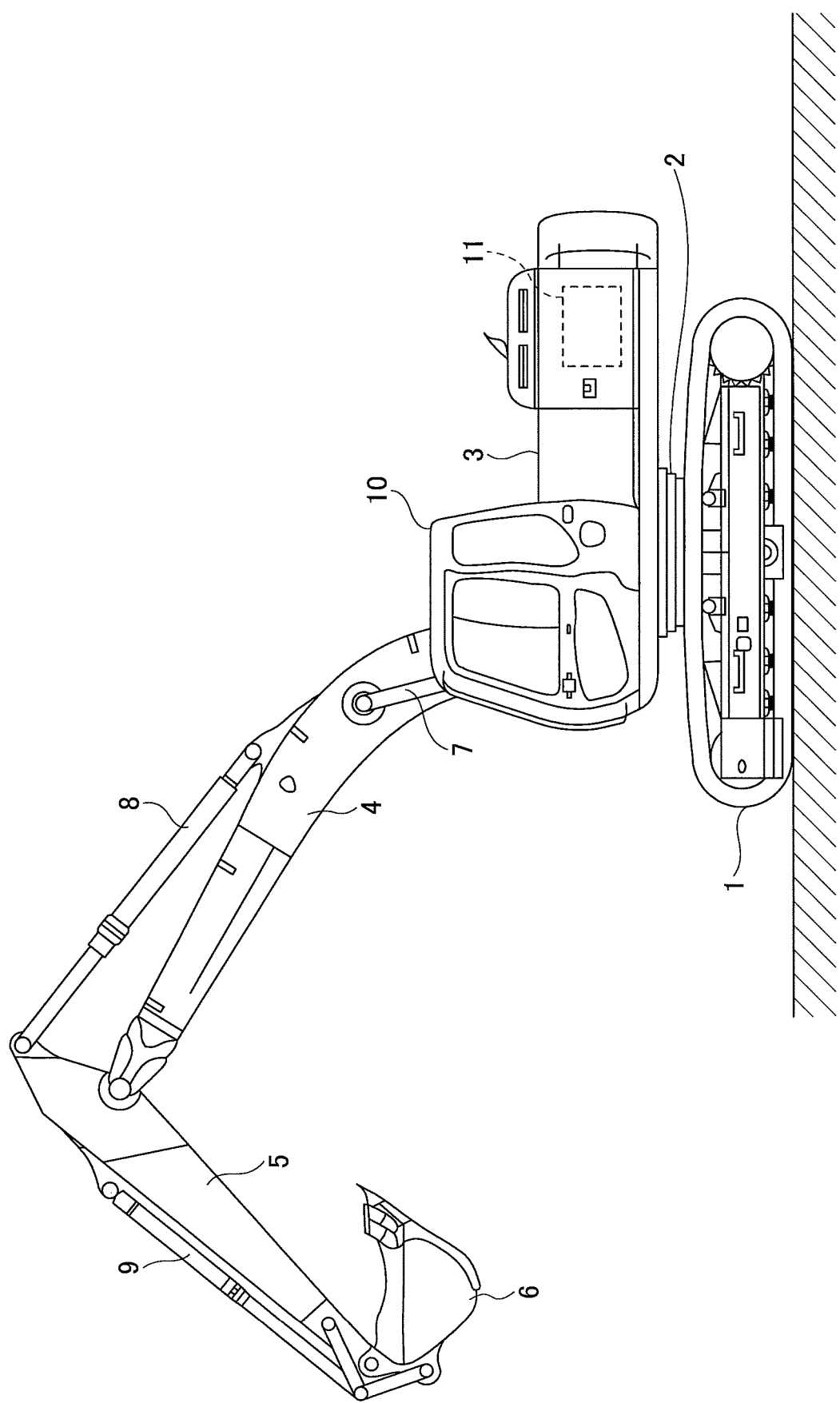
FIG. 1 is a side view of a shovel according to an embodiment of the present invention.

First, a shovel, which is a construction machine, according to an embodiment of the present invention is described with reference to FIG. 1. FIG. 1 is a side view of the shovel according to the present embodiment. As illustrated by FIG. 1, the shovel includes a lower traveling body 1 on which an upper rotating body is mounted via a rotating mechanism 2. A boom 4 is attached to the upper rotating body 3. An arm 5 is attached to an end of the boom 4, and a bucket 6, which is an end attachment, is attached to an end of the arm 5. The boom 4, the arm 5, and the bucket 6 are hydraulically-driven by a boom cylinder 7, an arm cylinder 8, and a bucket cylinder 9, respectively. The upper rotating body 3 includes a cabin 10 and a power source such as an engine 11.

Figure 2:
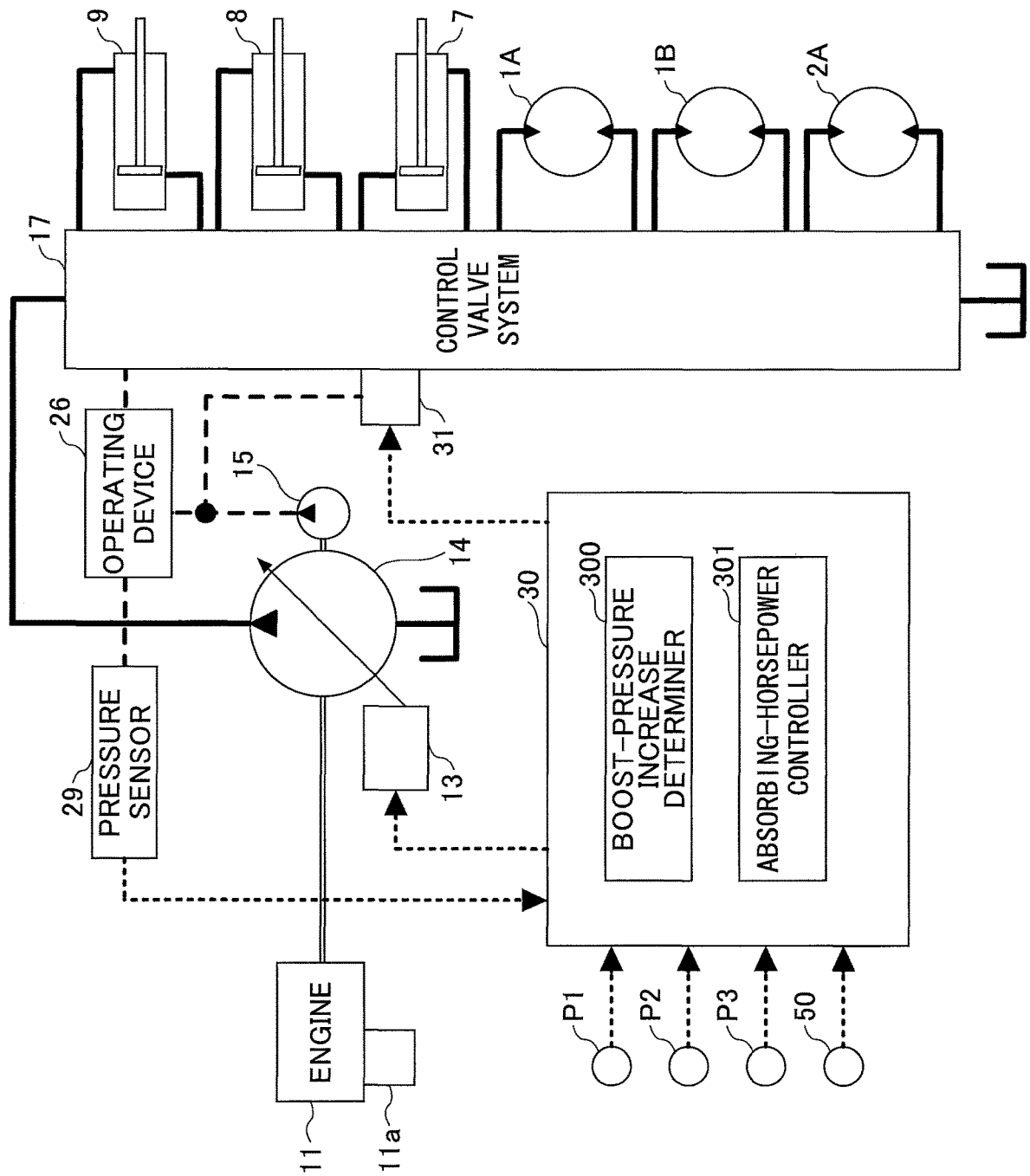
FIG. 2 is a drawing illustrating an exemplary configuration of a driving system of the shovel of FIG. 1.

FIG. 2 is a drawing illustrating an exemplary configuration of a driving system of the shovel of FIG. 1. In FIG. 2, a mechanical driving system is represented by double lines, high-pressure hydraulic lines are represented by bold-solid lines, pilot lines are represented by dashed lines, and an electric control system is represented by dotted lines.

The driving system of the shovel includes an engine 11, a regulator 13, a main pump 14, a pilot pump 15, a control valve system 17, an operating device 26, a pressure sensor 29, a controller 30, a pressure control valve 31, an atmospheric pressure sensor P1, a discharge pressure sensor P2, a boost pressure sensor P3, and a switcher 50.

The engine 11 is a driving source of the shovel. In the present embodiment, the engine 11 is, for example, an internal-combustion engine such as a diesel engine that is configured to maintain a predetermined revolution speed. The output shaft of the engine 11 is connected to input shafts of the main pump 14 and the pilot pump 15. In the present embodiment, a supercharger 11a is provided on the engine 11. For example, the supercharger 11a may be configured to use an exhaust gas of the engine 11 to rotate a turbine and drive a centrifugal compressor by the rotational force of the turbine to increase an intake pressure (to generate a boost pressure). The supercharger 11a may also be configured to generate a boost pressure by using the rotation of the output shaft of the engine 11. With this configuration, the engine 11 can increase the boost pressure and increase the engine power according to an increase in the load.

The main pump 14 supplies a hydraulic oil via a high-pressure hydraulic line to the control valve system 17 and may be implemented by, for example, a variable-displacement swash-plate hydraulic pump.

The regulator 13 controls the discharge rate of the main pump 14. In the present embodiment, the regulator 13 adjusts the inclination angle of a swash plate of the main pump 14 according to, for example, the discharge pressure of the main pump 14 or a control signal from the controller 30 to control the discharge rate of the main pump 14.

The pilot pump 15 supplies a hydraulic oil via pilot lines to hydraulic control devices including the operating device 26 and the pressure control valve 31 and may be implemented by, for example, a fixed-displacement hydraulic pump.

The control valve system 17 is a hydraulic control device that controls the hydraulic system of the shovel. More specifically, the control valve system 17 includes multiple flow control valves that control the flow of the hydraulic oil discharged from the main pump 14. With the flow control valves, the control valve system 17 selectively supplies the hydraulic oil discharged from the main pump 14 to one or more hydraulic actuators. The hydraulic actuators include the boom cylinder 7, the arm cylinder 8, the bucket cylinder 9, a traveling hydraulic motor 1A (left), a traveling hydraulic motor 1B (right), and a rotating hydraulic motor 2A.

The operating device 26 is used by an operator to operate the hydraulic actuators. In the present embodiment, the operating device 26 supplies the hydraulic oil discharged from the pilot pump 15 via pilot lines to pilot ports of the flow control valves corresponding to the hydraulic actuators. The pressure (pilot pressure) of the hydraulic oil supplied to each pilot port corresponds to the operation direction and the operation amount of a lever or a pedal (not shown) of the operating device 26 corresponding to one of the hydraulic actuators.

The pressure sensor 29 detects operations performed by the operator using the operating device 26. In the present embodiment, the pressure sensor 20 detects pressures representing the operation direction and the operation amount of a lever or a pedal of the operating device 26 corresponding to each hydraulic actuator, and outputs the detected pressures to the controller 30. Operations performed using the operating device 26 may also be detected by a sensor other than a pressure sensor.

The controller 30 is a control device that controls the shovel. In the present embodiment, the controller 30 may be implemented by, for example, a computer including a central processing unit (CPU), a random access memory (RAM), and a read-only memory (ROM). The controller 30 reads programs corresponding to a boost-pressure increase determiner 300 and an absorbing-horsepower controller 301 from the ROM, loads the read programs into the RAM, and causes the CPU to perform processes corresponding to the programs.

Specifically, the controller 30 receives signals output from the pressure sensor 29, the atmospheric pressure sensor P1, the discharge pressure sensor P2, the boost pressure sensor P3, and the switcher 50. Based on the received signals, the boost-pressure increase determiner 300 and the absorbing-horsepower controller 301 perform the corresponding processes. Then, the controller 30 outputs control signals corresponding to the results of processes performed by the boost-pressure increase determiner 300 and the absorbing-horsepower controller 301 to, for example, the regulator 13 and the pressure control valve 31 as necessary.

More specifically, the boost-pressure increase determiner 300 determines whether it is necessary to increase the boost pressure. When the boost-pressure increase determiner 300 determines that it is necessary to increase the boost pressure, the absorbing-horsepower controller 301 controls the pressure control valve 31 to increase the discharge pressure of the main pump 14. Also, the absorbing-horsepower controller 301 may be configured to increase the discharge rate of the main pump 14 in addition to the discharge pressure by adjusting the regulator 13.

The pressure control valve 31 operates according to a command output from the controller 30. In the present embodiment, the pressure control valve 31 is a solenoid pressure reducing valve that adjusts a control pressure introduced from the pilot pump 15 into a pilot port of a specific flow control valve in the control valve system 17 according to a current command output by the controller 30. The controller 30 operates the specific flow control valve to limit the flow of the hydraulic oil discharged from the main pump 14 and thereby increase the discharge pressure of the main pump 14.

Thus, the controller 30 increases the discharge pressure of the main pump 14 to voluntarily increase the absorbing horsepower of the main pump 14. Also, the controller 30 may be configured to increase the discharge rate of the main pump 14 in addition to the discharge pressure to voluntarily increase the absorbing horsepower of the main pump 14. Here, "to voluntarily increase the absorbing horsepower" means increasing the absorbing horsepower independently of an external force such as an excavation reaction force, i.e., increasing the absorbing horsepower even when there is no increase in the hydraulic load.

The atmospheric pressure sensor P1 detects an atmospheric pressure and outputs the detected atmospheric pressure to the controller 30. The discharge pressure sensor P2 detects a discharge pressure of the main pump and outputs the detected discharge pressure to the controller 30. The boost pressure sensor P3 detects a boost pressure generated by the supercharger 11a and outputs the detected boost pressure to the controller 30.

The switcher 50 is a switch that activates and deactivates a function (which is hereafter referred to as an "absorbing-horsepower increasing function") of the controller 30 for voluntarily increasing the absorbing horsepower of the main pump 14. The switcher 50 may be disposed in, for example, the cabin 10. The operator turns on the switcher 50 to activate the absorbing-horsepower increasing function and turns off the switcher to deactivate the absorbing-horsepower increasing function. More specifically, when the switcher 50 is turned off, the controller 30 stops execution of the boost-pressure increase determiner 300 and the absorbing-horsepower controller 301 and deactivates their functions.

Figure 3:
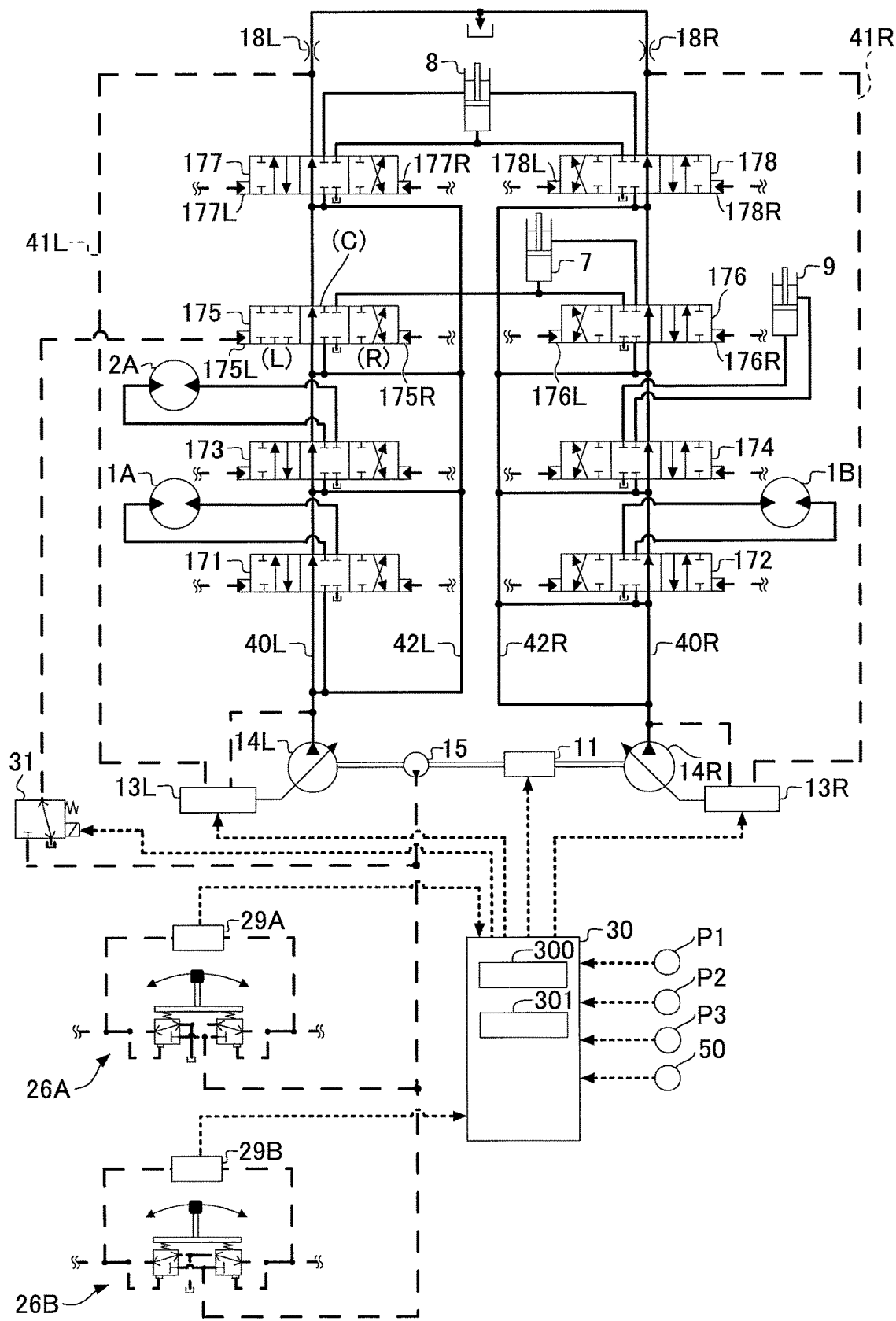
FIG. 3 is a drawing illustrating an exemplary configuration of a hydraulic system of the shovel of FIG. 1.

A mechanism for changing the absorbing horsepower of the main pump 14 is described below with reference to FIG. 3. FIG. 3 is a drawing illustrating an exemplary configuration of a hydraulic system of the shovel of FIG. 1. In FIG. 3, similarly to FIG. 2, a mechanical driving system is represented by double lines, high-pressure hydraulic lines are represented by bold-solid lines, pilot lines are represented by dashed lines, and an electric control system is represented by dotted lines.

As illustrated by FIG. 3, the hydraulic system is configured to circulate a hydraulic oil from main pumps 14L and 14R driven by the engine 11, via center bypass pipe lines 40L and 40R and parallel pipe lines 42L and 42R, to a hydraulic oil tank. The main pumps 14L and 14R correspond to the main pump 14 of FIG. 2.

The center bypass pipe line 40L is a high-pressure hydraulic line that passes through flow control valves 171, 173, 175, and 177 disposed in the control valve system 17. The center bypass pipe line 40R is a high-pressure hydraulic line that passes through flow control valves 172, 174, 176, and 178 disposed in the control valve system 17.

The flow control valve 171 is a spool valve that supplies the hydraulic oil discharged from the main pump 14L to the traveling hydraulic motor 1A (left) and changes the flow of the hydraulic oil to discharge the hydraulic oil from the traveling hydraulic motor 1A (left) into the hydraulic oil tank.

The flow control valve 172 is a spool valve that supplies the hydraulic oil discharged from the main pump 14R to the traveling hydraulic motor 1B (right) and changes the flow of the hydraulic oil to discharge the hydraulic oil from the traveling hydraulic motor 1B (right) into the hydraulic oil tank.

The flow control valve 173 is a spool valve that supplies the hydraulic oil discharged from the main pump 14L to the rotating hydraulic motor 2A and changes the flow of the hydraulic oil to discharge the hydraulic oil from the rotating hydraulic motor 2A into the hydraulic oil tank.

The flow control valve 174 is a spool valve that supplies the hydraulic oil discharged from the main pump 14R to the bucket cylinder 9 and discharges the hydraulic oil from the bucket cylinder 9 into the hydraulic oil tank.

The flow control valves 175 and 176 are spool valves that supply the hydraulic oil discharged from the main pumps 14L and 14R to the boom cylinder 7 and change the flow of the hydraulic oil to discharge the hydraulic oil from the boom cylinder 7 into the hydraulic oil tank. In the present embodiment, the flow control valve 175 operates only when a raising operation of the boom 4 is performed and does not operate when a lowering operation of the boom 4 is performed. More specifically, when a raising operation of the boom 4 is performed, the flow control valve 175 moves from a center valve position (C) toward a right valve position (R). On the other hand, even when a lowering operation of the boom 4 is performed, the flow control valve 175 does not move from the center valve position (C) toward a left valve position (L) but remains at the center valve position (C). Accordingly, the left valve position (L) of the flow control valve 175 can be used for other purposes. The controller 30 uses the left valve position (L) of the flow control valve 175 to activate the absorbing-horsepower increasing function.

The flow control valves 177 and 178 are spool valves that supply the hydraulic oil discharged from the main pumps 14L and 14R to the arm cylinder 8 and change the flow of the hydraulic oil to discharge the hydraulic oil from the arm cylinder 8 into the hydraulic oil tank.

The parallel pipe line 42L is a high-pressure hydraulic line that extends parallel to the center bypass pipe line 40L. When the flow of the hydraulic oil passing through the center bypass pipe line 40L is limited or blocked by one of the flow control valves 171, 173, and 175, the parallel pipe line 42L supplies the hydraulic oil to a further downstream flow control valve. The parallel pipe line 42R is a high-pressure hydraulic line that extends parallel to the center bypass pipe line 40R. When the flow of the hydraulic oil passing through the center bypass pipe line 40R is limited or blocked by one of the flow control valves 172, 174, and 176, the parallel pipe line 42R supplies the hydraulic oil to a further downstream flow control valve.

In the present embodiment, the cross-sectional area of the parallel pipe line 42L is less than the cross-sectional area of the center bypass pipe line 40L. Accordingly, compared with the center bypass pipe line 40L, the parallel pipe line 42L allows the hydraulic oil to flow at a lower rate. When the flow of the hydraulic oil passing through the center bypass pipe line 40L is limited or blocked and the amount of the hydraulic oil passing through the parallel pipe line 42L increases, the discharge pressure of the main pump 14L increases, and the flow rate of the hydraulic oil that reaches a negative control throttle 18L decreases. The above descriptions also apply to the center bypass pipe line 40R and the parallel pipe line 42R.

Regulators 13L and 13R adjust the inclination angles of swash plates of the main pumps 14L and 14R according to the discharge pressures of the main pumps 14L and 14R to control the discharge rates of the main pumps 14L and 14R. The regulators 13L and 13R correspond to the regulator 13 of FIG. 2. More specifically, when the discharge pressures of the main pumps 14L and 14R become greater than or equal to a predetermined value, the regulators 13L and 13R adjust the inclination angles of the swash plates of the main pumps 14L and 14R to decrease the discharge rates of the main pumps 14L and 14R. This is to prevent the absorbing horsepower of the main pump 14, which is represented by a product of the discharge pressure and the discharge rate, from exceeding the output horsepower of the engine 11. Hereafter, this control is referred to as a "full horsepower control".

An arm operation lever 26A is an example of the operating device 26 and is used to operate the arm 5. The arm operation lever 26A introduces a control pressure corresponding to a lever operation amount to the pilot ports of the flow control valves 177 and 178 by using the hydraulic oil discharged from the pilot pump 15. More specifically, when the arm operation lever 26A is operated in an arm closing direction, the hydraulic oil is introduced into a right pilot port 177R of the flow control valve 177 and into a left pilot port 178L of the flow control valve 178. On the other hand, when the arm operation lever 26A is operated in an arm opening direction, the hydraulic oil is introduced into a left pilot port 177L of the flow control valve 177 and into a right pilot port 178R of the flow control valve 178.

A boom operation lever 26B is an example of the operating device 26 and is used to operate the boom 4. The boom operation lever 26B introduces a control pressure corresponding to a lever operation amount to the pilot ports of the flow control valves 175 and 176 by using the hydraulic oil discharged from the pilot pump 15. More specifically, when the boom operation lever 26B is operated in a boom raising direction, the hydraulic oil is introduced into a right pilot port 175R of the flow control valve 175 and into a left pilot port 176L of the flow control valve 176. On the other hand, when the boom operation lever 26B is operated in a boom lowering direction, the hydraulic oil is not introduced into a left pilot port 175L of the flow control valve 175 but is introduced into only a right pilot port 176R of the flow control valve 176.

Pressure sensors 29A and 29B are examples of the pressure sensor 29. The pressure sensors 29A and 29B detect pressures representing operations performed by the operator on the arm operation lever 26A and the boom operation lever 26B, and output the detected pressures to the controller 30. Each operation is indicated by, for example, a lever operation direction and a lever operation amount (lever operation angle).

Right and left driving levers (or pedals), a bucket operation lever, and a rotation operation lever (which are not shown) are operation devices used to drive the lower traveling body 1, to open and close a the bucket 6, and to rotate the upper rotating body 3, respectively. Similarly to the arm operation lever 26A, each of these operation devices introduces a control pressure corresponding to a lever operation amount (or a pedal operation amount) to one of right and left pilot ports of a flow control valve corresponding to one of the hydraulic actuators by using the hydraulic oil discharged from the pilot pump 15. Also, similarly to the pressure sensor 29A, a pressure sensor corresponding to each of these operation devices detects a pressure representing an operation performed by the operator on the corresponding operation device and outputs the detected pressure to the controller 30.

The controller 30 receives pressures detected by pressure sensors such as the pressure sensor 29A and outputs control signals to the regulators 13L and 13R as necessary to change the discharge rates of the main pumps 14L and 14R.

The pressure control valve 31 adjusts a control pressure introduced from the pilot pump 15 into the left pilot port 175L of the flow control valve 175 according to a current command output from the controller 30. Thus, the movement of the flow control valve 175 to the left valve position (L) is not caused by any of the operation levers including the boom operation lever 26B, and is solely caused by a pilot pressure generated by the pressure control valve 31. Also, the pressure control valve 31 can adjust the control pressure such that the flow control valve 175 can be stopped at two positions, a first intermediate position and a second intermediate position, when the flow control valve 175 is moved from the center valve position (C) to the left valve position (L). The first intermediate position is a valve position at which the opening area of the center bypass pipe line 40L becomes 70% of the maximum opening area, and the second intermediate position is a valve position at which the opening area of the center bypass pipe line 40L becomes 30% of the maximum opening area. Here, the opening area becomes the maximum opening area when the flow control valve 175 is at the valve position (C). Also, the opening area becomes 0% when the flow control valve 175 is at the valve position (L).

A negative control employed by the hydraulic system of FIG. 3 is described below.

The center bypass pipe lines 40L and 40R include negative control throttles 18L and 18R between the most downstream flow control valves 177 and 178 and the hydraulic oil tank. The flow of the hydraulic oil discharged from the main pumps 14L and 14R is limited by the negative control throttles 18L and 18R. The negative control throttles 18L and 18R generate control pressures (which are hereafter referred to as "negative control pressures") to control the regulators 13L and 13R.

Negative control pressure pipe lines 41L and 41R indicated by dashed lines are pilot lines for transmitting negative control pressures generated upstream of the negative control throttles 18L and 18R to the regulators 13L and 13R.

The regulators 13L and 13R adjust the inclination angles of the swash plates of the main pumps 14L and 14R according to the negative control pressures to control the discharge rates of the main pumps 14L and 14R. The regulators 13L and 13R decrease the discharge rates of the main pumps 14L and 14R as the negative control pressures increase, and increase the discharge rates of the main pumps 14L and 14R as the negative control pressures decrease.

Specifically, as illustrated in FIG. 3, when none of the hydraulic actuators of the shovel is being operated (this state is hereafter referred to as a "standby mode"), the hydraulic oil discharged from the main pumps 14L and 14R pass through the center bypass pipe lines 40L and 40R and reach the negative control throttles 18L and 18R. In this case, the flow of the hydraulic oil discharged from the main pumps 14L and 14R increases the negative control pressures generated upstream of the negative control throttles 18L and 18R. As a result, the regulators 13L and 13R decrease the discharge rates of the main pumps 14L and 14R to a minimum allowable discharge rate to reduce a pressure loss (pumping loss) that occurs when the discharged hydraulic oil passes through the center bypass pipe lines 41L and 40R.

On the other hand, when a hydraulic actuator is activated, the hydraulic oil discharged from the main pumps 14L and 14R flows via the corresponding flow control valve into the operated hydraulic actuator. In this case, the amount of the hydraulic oil that is discharged from the main pumps 14L and 14R and reaches the negative control throttles 18L and 18R decreases or becomes zero, and the negative control pressures generated upstream of the negative control throttles 18L and 18R decrease. As a result, the regulators 13L and 13R receiving the decreased negative control pressures increase the discharge rates of the main pumps 14L and 14R to supply a sufficient amount of the hydraulic oil to the operated hydraulic actuator and thereby stably drive the operated hydraulic actuator.

With the above configuration, the hydraulic system of FIG. 3 can reduce unnecessary energy consumption of the main pumps 14L and 14R during the standby mode. Here, the unnecessary energy consumption includes the pumping loss that occurs when the hydraulic oil discharged from the main pumps 14L and 14R passes through the center bypass pipe lines 40L and 40R.

Also, the hydraulic system of FIG. 3 is configured such that a sufficient amount of the hydraulic oil can be reliably supplied from the main pumps 14L and 14R to a hydraulic actuator to be activated.

Figure 4:
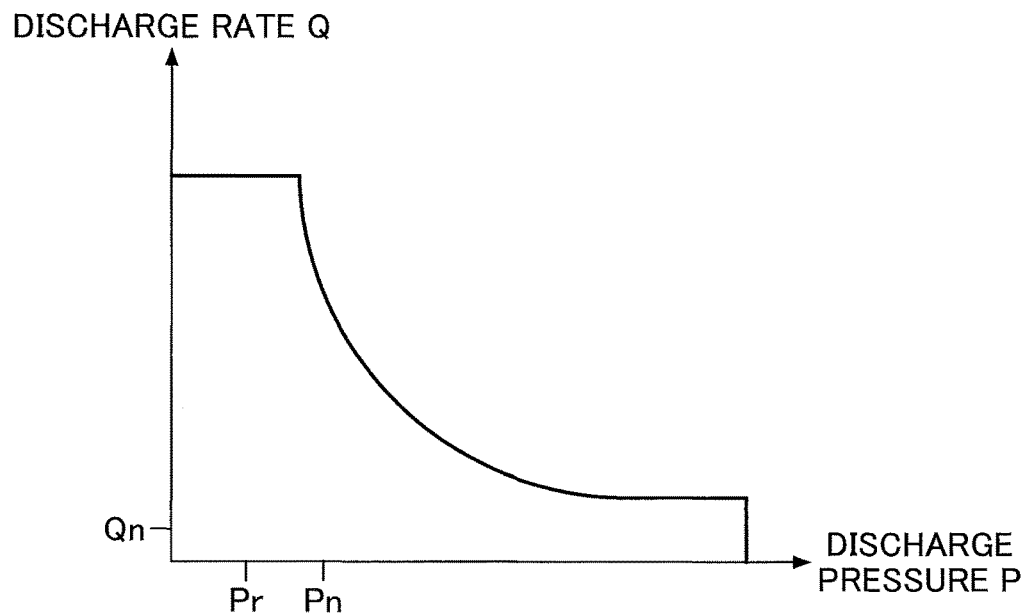
FIG. 4 is a graph illustrating an exemplary relationship between the discharge pressure and the discharge rate of a main pump.

Next, a relationship between the full horsepower control by the regulator 13 and the negative control is described with reference to FIG. 4. FIG. 4 is a graph illustrating an exemplary relationship between a discharge rate Q and a discharge pressure P of the main pump 14.

The regulator 13 controls the discharge rate Q of the main pump 14 according to a full power control curve indicated by a solid line in FIG. 4. Specifically, the regulator 13 decreases the discharge rate Q as the discharge pressure P increases so that the absorbing horsepower of the main pump 14 does not exceed the engine output. Also, apart from the full power control, the regulator 13 controls the discharge rate Q of the main pump 14 according to a negative control pressure. Specifically, the regulator 13 decreases the discharge rate Q as the negative control pressure increases. When the negative control pressure further increases and exceeds a predetermined value, the regulator 13 decreases the discharge rate Q to a negative control flow rate Qn that is the minimum allowable discharge rate. As a result, the negative control pressure decreases to a predetermined pressure Pn. However, the regulator 13 does not increase the discharge rate Q and maintains the negative control flow rate Qn until the negative control pressure becomes lower than a negative control cancellation pressure Pr (<Pn).

Also in the present embodiment, apart from the full power control and the negative control, the regulator 13 controls the discharge rate Q of the main pump 14 according to a control signal from the controller 30. Specifically, the regulator 13 increases and decreases the discharge rate Q according to a control signal output by the controller 30 when the boost-pressure increase determiner 300 determines that the boost pressure needs to be increased.

More specifically, the boost-pressure increase determiner 300 determines that the boost pressure needs to be increased when, for example, the shovel is in the standby mode. In this case, the absorbing-horsepower controller 301 controls the pressure control valve 31 to increase the discharge pressure of the main pump 14. In the present embodiment, the absorbing-horsepower controller 301 introduces the hydraulic oil into the left pilot port 175L of the flow control valve 175 to cause the flow control valve 175 to move from the center valve position (C) toward the left valve position (L). The flow control valve 175 moved toward the left valve position (L) limits the flow rate of the hydraulic oil flowing through the center bypass pipe line 40L and increases the discharge pressure of the main pump 14L. As a result, the absorbing horsepower of the main pump 14 increases and the engine load increases, and the absorbing-horsepower controller 301 can increase the boost pressure. Also, the absorbing-horsepower controller 301 monitors whether the boost pressure generated by the supercharger 11a has reached a desired boost pressure based on the output of the boost pressure sensor P3.

Then, when the current boost pressure is not at the desired boost pressure, the absorbing-horsepower controller 301 outputs a control signal to the regulator 13L to adjust the regulator 13L and thereby adjust the discharge rate of the main pump 14L in addition to the discharge pressure. More specifically, when the current boost pressure is lower than the desired boost pressure, the absorbing-horsepower controller 301 may adjust the regulator 13L to increase the discharge rate of the main pump 14L and increase the absorbing horsepower of the main pump 14L. Also, when the current boost pressure is higher than the desired boost pressure, the absorbing-horsepower controller 301 may adjust the regulator 13L to decrease the discharge rate of the main pump 14L and decrease the absorbing horsepower of the main pump 14L.

Figure 5:
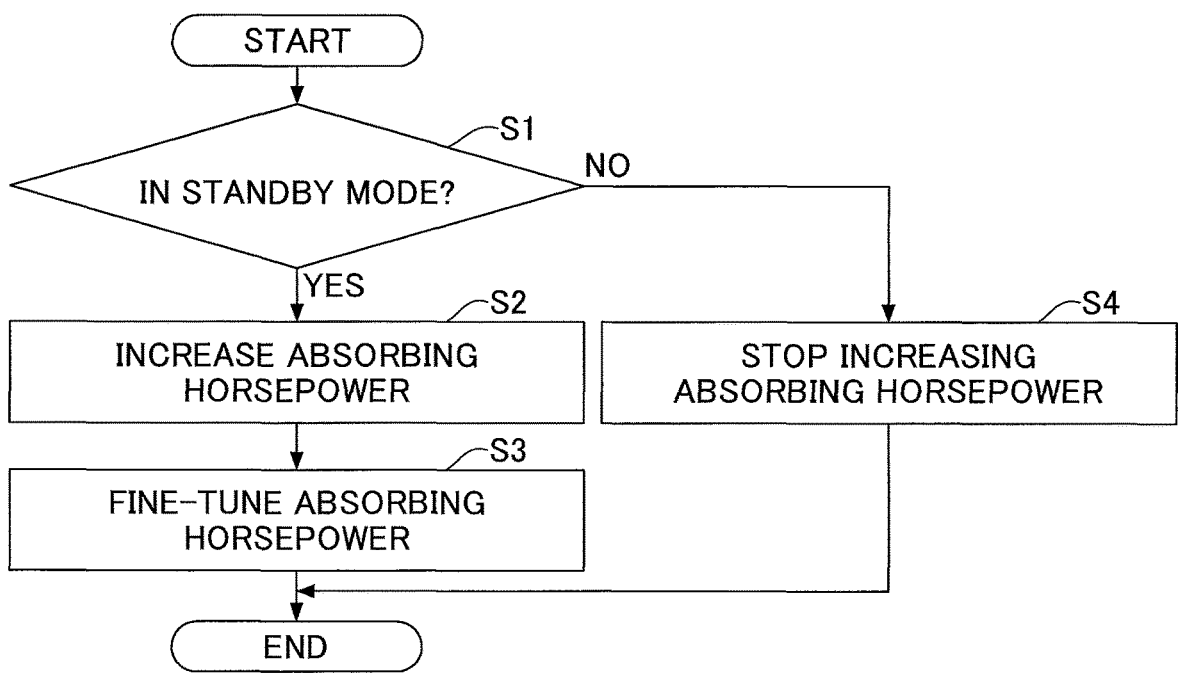
FIG. 5 is a flowchart illustrating an exemplary absorbing-horsepower increasing process.

Next, a process (which is hereafter referred to as an "absorbing-horsepower increasing process") performed by the controller 30 to voluntarily increase the absorbing horsepower of the main pump 14 is described with reference to FIG. 5. FIG. 5 is a flowchart illustrating an absorbing-horsepower increasing process. The controller 30 repeats the absorbing-horsepower increasing process at predetermined intervals. In the present embodiment, because the switcher 50 is manually turned on, the controller 30 can activate the boost-pressure increase determiner 300 and the absorbing-horsepower controller 301. Here, in an environment such as a high altitude where the atmospheric pressure is comparatively low, it is difficult to increase the boost pressure after an increase in the hydraulic load is detected as in an environment where the atmospheric pressure is comparatively high. This may result in, for example, generation of black smoke due to incomplete combustion of fuel and an engine power shortage, and may further result in an engine stop.

First, the boost-pressure increase determiner 300 of the controller 300 determines whether it is necessary to increase the boost pressure. In the present embodiment, the boost-pressure increase determiner 300 determines whether the shovel is in the standby mode (step S1). Also in the present embodiment, the boost-pressure increase determiner 300 determines whether the shovel is in the standby mode based on whether the discharge pressure of the main pump 14 is greater than or equal to a predetermined pressure. For example, the boost-pressure increase determiner 300 determines that the shovel is in the standby mode, i.e., the boost pressure needs to be increased, when the discharge pressure of the main pump 14 is less than the predetermined pressure. Also, the boost-pressure increase determiner 300 may determine whether the shovel is in the standby mode based on the pressures of the hydraulic actuators.

When the boost-pressure increase determiner 300 determines that the shovel is in the standby mode (no hydraulic load is being applied) (YES at step S1), the absorbing-horsepower controller 301 of the controller 30 increases the absorbing horsepower of the main pump 14 to increase the boost pressure (step S2). In the present embodiment, the absorbing-horsepower controller 301 outputs a current command to the pressure control valve 31 to increase the control pressure introduced into the left pilot port 175L of the flow control valve 175. When the control pressure introduced into the left pilot port 175L increases, the flow control valve 175 moves from the center valve position (C) toward the left valve position (L) to limit the flow rate of the hydraulic oil flowing through the center bypass pipe line 40L and increase the discharge pressure of the main pump 14L. Also, the flow control valve 175 causes the amount of the hydraulic oil reaching the negative control throttle 18L to decrease or become zero, and thereby decreases the negative control pressure generated upstream of the negative control throttle 18L. As a result, the regulator 13L receiving the decreased negative control pressure increases the discharge rate of the main pump 14L. Thus, the absorbing-horsepower controller 301 increases the discharge pressure and the discharge rate of the main pump 14L and thereby increases the absorbing horsepower of the main pump 14L. With this configuration, the absorbing-horsepower controller 301 can apply a load sufficient to increase the boost pressure to the engine 11 even in the standby mode. Here, when the absorbing horsepower of the main pump 14L increases, the rotational load of the engine 11 increases and therefore the engine 11 increases the fuel injection amount to maintain a predetermined revolution speed. The increase in the fuel injection amount results in an increase in the exhaust pressure, an increase in the rotational speed of the turbine, and an increase in the rotational speed of the centrifugal compressor, which further result in an increase in the boost pressure.

Thereafter, the absorbing-horsepower controller 301 fine-tunes the absorbing horsepower of the main pump 14L while monitoring whether the boost pressure has reached a desired boost pressure based on the output of the boost pressure sensor P3 (step S3). In the present embodiment, the absorbing-horsepower controller 301 outputs a control signal to the regulator 13L. When receiving the control signal, the regulator 13L stops adjusting the inclination angle of the swash plate based on the negative control pressure. Then, the regulator 13L adjusts the inclination angle of the swash plate based on the control signal to increase or decrease the discharge rate of the main pump 14L. Thus, the absorbing-horsepower controller 301 can achieve the desired boost pressure by fine-tuning the absorbing horsepower of the main pump 14L increased by using the pressure control valve 31 and thereby fine-tuning the boost pressure. However, the absorbing-horsepower controller 301 may omit the fine-tuning of the absorbing horsepower of the main pump 14L by the regulator 13L.

On the other hand, when the boost-pressure increase determiner 300 determines that the shovel is not in the standby mode (a hydraulic load is being applied) (NO at step S1) and the absorbing horsepower of the main pump 14 is being increased to increase the boost pressure, the absorbing-horsepower controller 301 stops increasing the absorbing horsepower (step S4). That is, in this case, because the activation of a hydraulic actuator increases the absorbing horsepower of the main pump 14 and increases the boost pressure, it is not necessary to voluntarily increase the absorbing horsepower of the main pump 14L. In the present embodiment, if the absorbing-horsepower controller 301 is outputting a current command to the pressure control valve 31, the absorbing-horsepower controller 301 stops outputting the current command. Also, if the absorbing-horsepower controller 301 is increasing the control pressure introduced into the left pilot port 175L of the flow control valve 175, the absorbing-horsepower controller 301 stops increasing the control pressure. When the absorbing-horsepower controller 301 stops increasing the control pressure introduced into the left pilot port 175L, the flow control valve 175 moves from the left valve position (L) toward the center valve position (C). As a result, the flow control valve 175 stops limiting the flow rate of the hydraulic oil flowing through the center bypass pipe line 40L and stops increasing the discharge pressure of the main pump 14L. Compared with a case where the flow control valve 175 is moved toward the left valve position (L), moving the flow control valve 175 toward the center valve position (C) increases the amount of the hydraulic oil reaching the negative control throttle 18L and thereby increases the negative control pressure generated upstream of the negative control throttle 18L. As a result, the regulator 13L receiving the increased negative control pressure decreases the discharge rate of the main pump 14L. Thus, the absorbing-horsepower controller 301 stops increasing the discharge pressure and the discharge rate of the main pump 14L and thereby stops increasing the absorbing horsepower of the main pump 14L. Here, when the absorbing-horsepower controller 301 stops increasing the absorbing horsepower of the main pump 14L, the rotational load of the engine 11 returns to a previous level before the increase of the absorbing horsepower and therefore the engine 11 decreases the fuel injection amount to a previous level before the increase of the absorbing horsepower. When the fuel injection amount returns to the previous level before the increase of the absorbing horsepower, the exhaust pressure, the rotational speed of the turbine, and the rotational speed of the centrifugal compressor return to previous levels before the increase of the absorbing horsepower, and the boost pressure also returns to a previous level before the increase of the absorbing horsepower.

Thus, the controller 30 increases the absorbing horsepower of the main pump 14 during the standby mode. With this configuration, the controller 30 can voluntarily apply a predetermined load to the engine 11 and increase the boost pressure of the supercharger 11a even when no hydraulic load is being applied by an external force such as an excavation reaction force. That is, the controller 30 can increase the boost pressure by a predetermined amount before the hydraulic load increases due to an external force without directly controlling the engine 11 and the supercharger 11a. Even in an environment where the boost pressure cannot be increased quickly due to a low atmospheric pressure, this configuration makes it possible to generate a boost pressure corresponding to an increasing hydraulic load before a problem such as a decrease in the engine revolution speed (a decrease in responsiveness and performance) or an engine stop occurs.

Figure 6:
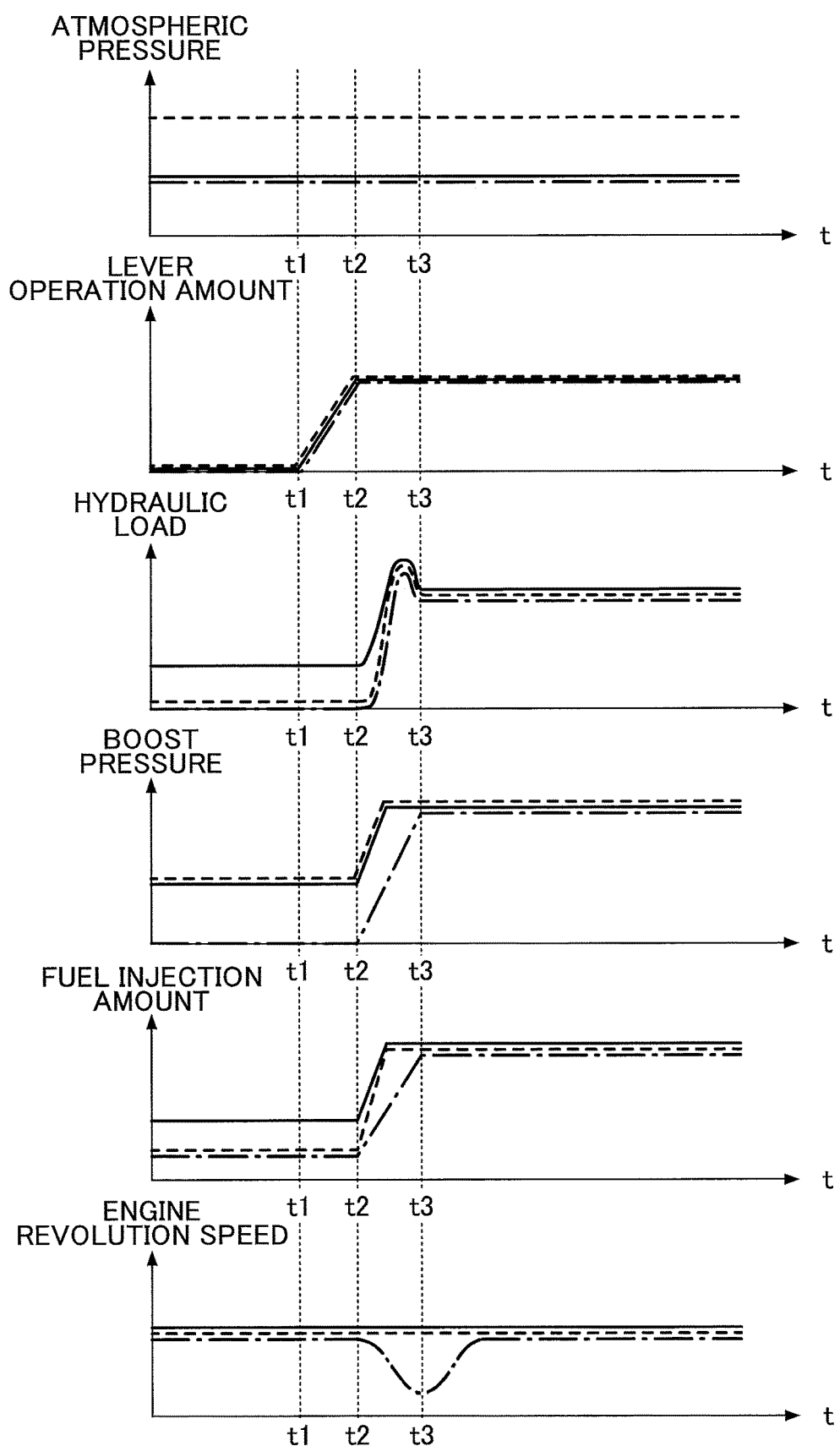
FIG. 6 is a drawing illustrating temporal changes in physical quantities observed when the absorbing-horsepower increasing process of FIG. 5 is performed.

Temporal changes in physical quantities, which are observed when the absorbing-horsepower increasing process is performed, are described with reference to FIG. 6. FIG. 6 is a drawing illustrating temporal changes in physical quantities including the atmospheric pressure, the lever operation amount, the hydraulic load (absorbing horsepower), the boost pressure, the fuel injection amount, and the engine revolution speed arranged in this order from the top. Each dashed line in FIG. 6 indicates a temporal change in a case where the shovel is at low altitude (in a comparatively-high atmospheric pressure environment) and the absorbing-horsepower increasing process is not performed. Each dashed-dotted line in FIG. 6 indicates a temporal change in a case where the shovel is at high altitude (in a comparatively-low atmospheric pressure environment) and the absorbing-horsepower increasing process is not performed. Also, each solid line in FIG. 6 indicates a temporal change in a case where the shovel is at high altitude (in a comparatively-low atmospheric pressure environment) and the absorbing-horsepower increasing process is performed.

In FIG. 6, it is assumed that a lever is operated at a time t1 to move, for example, the arm 5 for excavation.

First, for comparison, temporal changes in physical quantities in the case where the shovel is at low altitude (in a comparatively-high atmospheric pressure environment) and the absorbing-horsepower increasing process is not performed and in the case where the shovel is at high altitude (in a comparatively-low atmospheric pressure environment) and the absorbing-horsepower increasing process is not performed.

At the time t1, an operation of the arm operation lever is started to perform excavation. The operation amount of the arm operation lever (an angle the arm operation lever is tilted) increases from the time t1 to a time t2, and becomes constant at the time t2. That is, the arm operation lever is started to be tilted at the time t1, and the angle of the arm operation lever is fixed at the time t2. When the operation of the arm operation lever is started at the time t1, the arm 5 starts to move. At the time t2, the arm operation lever is fully tilted.

From the time t2 at which the arm operation lever is fully tilted, the discharge pressure of the main pump 14 starts to increase due to a load applied to the arm 5, and the hydraulic load of the main pump 14 starts to increase. That is, the hydraulic load of the main pump 14 starts to increase at around the time t2 as indicated by the dashed line and the dashed-dotted line. The hydraulic load of the main pump 14 corresponds to the load of the engine 11, and therefore the load of the engine 11 also increases along with the hydraulic load of the main pump 14. In the case where the shovel is at low altitude (in a comparatively-high atmospheric pressure environment), the revolution speed of the engine 11 is maintained at a predetermined revolution speed as indicated by the dashed line. On the other hand, in the case where the shovel is at high altitude (in a comparatively-low atmospheric pressure environment), the revolution speed of the engine 11 starts to decrease sharply at a point slightly after the time t2 as indicted by the dashed-dotted line. This is because there is a delay in the increase of the boost pressure in a comparatively-low atmospheric pressure environment, and an engine power corresponding to the load of the engine 11 cannot be achieved.

More specifically, when the load of the engine increases, the engine 11 is normally controlled to increase the fuel injection amount. This in turn increases the boost pressure, improves the combustion efficiency of the engine 11, and increases the power of the engine 11. However, while the boost pressure is low, the increase in the fuel consumption amount is limited and the combustion efficiency of the engine 11 cannot be sufficiently improved. As a result, an engine power corresponding to the load of the engine 11 is not achieved and the revolution speed of the engine 11 decreases.

For this reason, when the shovel is at high altitude (in a comparatively-low atmospheric pressure environment), the operator turns on the switcher 50 to activate the absorbing-horsepower increasing function. In response, the controller 30 performs the absorbing-horsepower increasing process to increase the boost pressure before a lever operation is performed.

Next, temporal changes in physical quantities in the case where the shovel is at high altitude (in a comparatively-low atmospheric pressure environment) and the absorbing-horsepower increasing process is performed are described with reference to FIG. 6. In FIG. 6, solid lines indicate temporal changes in physical quantities in the case where the shovel is at high altitude (in a comparatively-low atmospheric pressure environment) and the absorbing-horsepower increasing process is performed.

As described above, at the time t1, the operator starts to operate the arm operation lever to perform excavation. The operation amount of the arm operation lever (an angle the arm operation lever is tilted) increases from the time t1 to the time t2, and becomes constant at the time t2. That is, the arm operation lever is started to be tilted at the time t1, and the angle of the arm operation lever is fixed at the time t2. When the operation of the arm operation lever is started at the time t1, the arm 5 starts to move. At the time t2, the arm operation lever is fully tilted.

When the absorbing-horsepower increasing process is performed, the controller 30 increases the absorbing horsepower of the main pump 14 before the time t1, i.e., before the lever operation is performed. Accordingly, the engine 11 is controlled to increase the fuel injection amount to maintain the engine revolution speed at the predetermined revolution speed. As a result, the boost pressure is at a comparatively high level as in the case where the shovel is at low altitude (in a comparatively-high atmospheric pressure environment). That is, at the time t2 at which the arm operation lever is fully tilted, the boost pressure is at a level that can be quickly increased to a desired level.

Thus, the controller 30 increases the absorbing horsepower of the main pump 14 to apply a load to the engine 11 in advance so that the boost pressure can be quickly increased to a desired level after the time t2 at which the hydraulic load starts to increase.

After the time t2, the hydraulic load increases and the load of the engine 11 increases. As a result, the engine 11 is controlled to further increase the fuel injection amount, and the fuel consumption gradually increases. At this stage, the fuel consumption increases only by an amount corresponding to the increase in the hydraulic load. This is because the engine revolution speed is already maintained at the predetermined revolution speed and fuel consumption for increasing the engine revolution speed is not necessary. At a time t3, because the boost pressure is already greater than or equal to a predetermined value, the engine 11 is in a condition to be able to efficiently increase the engine output even when the hydraulic load increases.

As described above, by increasing the absorbing horsepower of the main pump 14 and applying a load to the engine 11 before a lever operation is performed, it is possible to start increasing the boost pressure before the hydraulic load starts to increase.

Here, as described above, in a comparatively-high atmospheric pressure environment, the boost pressure (indicated by the dashed line) is already at a comparatively high level at the time t1 without performing the absorbing horsepower increasing process.

Therefore, without the need to perform the absorbing horsepower increasing process, the supercharger 11a is in a condition to be able to quickly increase the boost pressure. Also, the engine 11 is in a condition to be able to supply a driving power corresponding to a hydraulic load caused by an external force without experiencing a problem such as a decrease in the engine revolution speed or an engine stop.

However, when the absorbing horsepower increasing process is not performed in a comparatively-low atmospheric pressure environment, the boost pressure (indicated by the dashed-dotted line) is still at a comparatively low level even at the time t2. Also, because the atmospheric pressure is comparatively low, the supercharger 11a cannot quickly increase the boost pressure. More specifically, until the time t3, the supercharger 11a cannot achieve a sufficient boost pressure and the engine 11 cannot sufficiently increase the fuel injection amount.

As a result, the engine 11 cannot output a driving power that is sufficient to maintain the engine revolution speed at a constant level, the engine revolution speed (indicated by the dashed-dotted line) decreases, and the engine 11 may stop without being able to increase the engine revolution speed.

For this reason, in a comparatively-low atmospheric pressure environment, the controller 30 performs the absorbing-horsepower increasing process to increase the absorbing horsepower of the main pump 14 before the time t1, i.e., before the lever operation is performed. Accordingly, the hydraulic load representing the absorbing horsepower of the main pump 14 is at a comparatively high level, and the boost pressure (indicated by the solid line) is also at a comparatively high level already at the time t2.

As a result, even in the comparatively-low atmospheric pressure environment, the supercharger 11a can quickly increase the boost pressure as in the comparatively-high atmospheric pressure environment. Also, the engine 11 is in a condition to be able to supply a driving power corresponding to a hydraulic load caused by an external force without experiencing a problem such as a decrease in the engine revolution speed or an engine stop.

When the arm 5 is brought into contact with the ground at the time t2, the hydraulic load increases according to an increase in the excavation reaction force. Then, as the hydraulic load corresponding to the absorbing horsepower of the main pump 14 increases, the load of the engine 11 also increases. In response, the supercharger 11a of the engine 11 can quickly increase the boost pressure to maintain the predetermined engine revolution speed.

Thus, when the atmospheric pressure is relatively low, the controller 30 voluntarily increases the absorbing horsepower of the main pump 14 before a lever operation is performed to maintain the boost pressure at a comparatively high level so that the boost pressure can be increased without delay after the lever operation is performed. This in turn makes it possible to prevent a problem such as a decrease in the engine revolution speed or an engine stop from occurring when a lever operation is performed.

Figure 7:
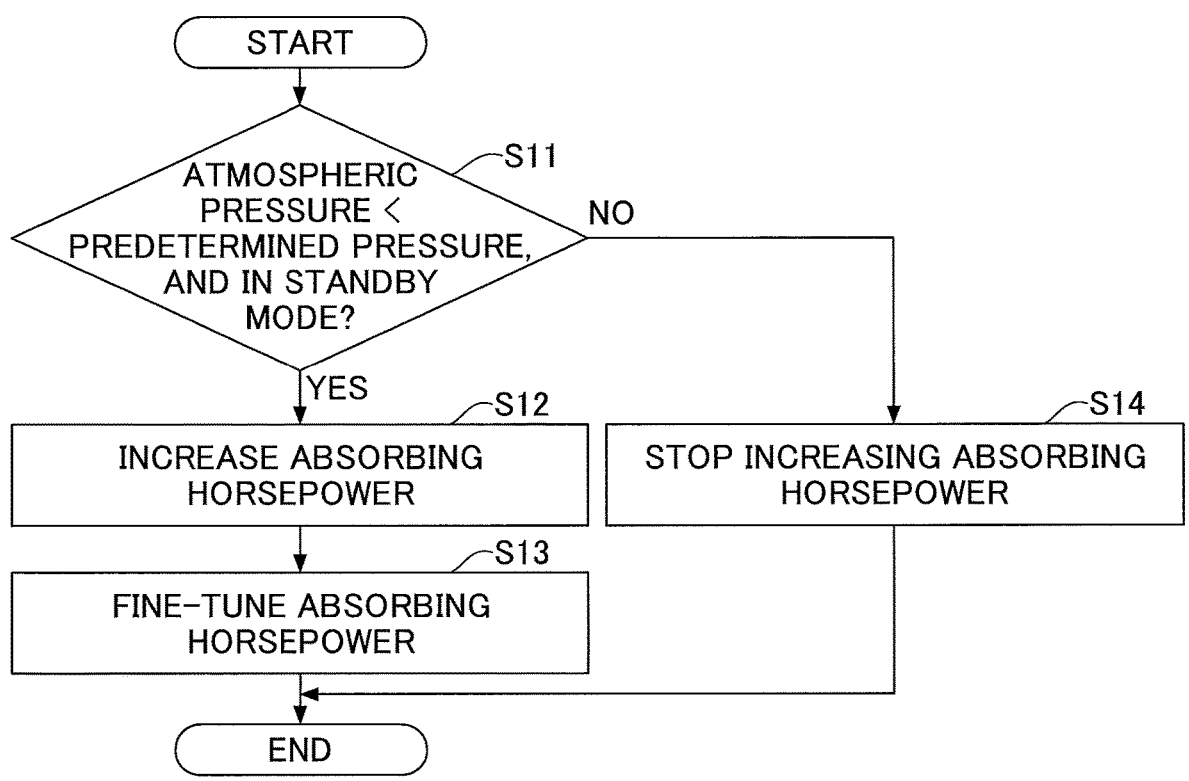
FIG. 7 is a flowchart illustrating another exemplary absorbing-horsepower increasing process.

Next, an absorbing-horsepower increasing process according to another embodiment is described with reference to FIG. 7. FIG. 7 is a flowchart illustrating another exemplary absorbing-horsepower increasing process. In the absorbing-horsepower increasing process of the present embodiment, a determination condition used at step S11 is different from the determination condition used at step S1 of the absorbing-horsepower increasing process of FIG. 5. However, steps S12 through S14 are the same as steps S2 through S4 of the absorbing-horsepower increasing process of FIG. 5. Accordingly, step S11 is described in detail, and descriptions of other steps are omitted here. Also in the present embodiment, the switcher 50 is omitted, and the controller 30 can always provide the functions of the boost-pressure increase determiner 300 and the absorbing-horsepower controller 301. However, instead of omitting the switcher 50, the shovel may be configured such that the switcher 50 is always turned on.

At step S11, the boost-pressure increase determiner 300 determines whether it is necessary to increase the boost pressure. In the present embodiment, the boost-pressure increase determiner 300 determines whether the shovel is in the standby mode and the atmospheric pressure around the shovel is less than a predetermined pressure. In the present embodiment, the controller 30 determines whether the atmospheric pressure around the shovel is less than the predetermined pressure, i.e., whether the shovel is at high altitude, based on an output from the atmospheric pressure sensor P1 of the shovel.

When it is determined that the above condition is satisfied (YES at step S11), the controller 30 performs steps S12 and S13 to increase and fine-tune the absorbing horsepower of the main pump 14L.

On the other hand, when it is determined that the above condition is not satisfied (NO at step S11), the controller 30 performs step S14 to stop increasing the absorbing horsepower of the main pump 14L if the absorbing horsepower is being increased. This is because when the atmospheric pressure is comparatively high, it is not necessary to voluntarily increase the boost pressure.

With the absorbing-horsepower increasing process of FIG. 7, the controller 30 can achieve advantageous effects similar to those achieved by the absorbing-horsepower increasing process of FIG. 5.

Also, in the present embodiment where the output of the atmospheric pressure sensor P1 is used, a target boost pressure may be determined according to a detected atmospheric pressure. In this case, the controller 30 may gradually or continuously change the target boost pressure according to the detected atmospheric pressure. That is, the controller 30 may be configured to gradually or continuously change the pilot pressure generated by the pressure control valve 31, the moving distance of the flow control valve 174, and the discharge pressure of the main pump 14L to achieve a target boost pressure. With this configuration, the controller 30 can gradually or continuously control the absorbing horsepower increased during the standby mode and can further reduce unnecessary energy consumption.

Also, the controller 30 may be configured to obtain the altitude of the current location of the shovel based on an output of a positioning device such as a global positioning system (GPS) device and map information, and to determine a target boost pressure based on the obtained altitude.

With the above-described configuration of the controller 30, when the boost-pressure increase determiner 300 determines that it is necessary to increase the boost pressure, the absorbing-horsepower controller 301 can voluntarily increase the absorbing horsepower of the main pump 14L by controlling the pressure control valve 31 and thereby increasing the discharge pressure of the main pump 14L. The increase in the absorbing horsepower of the main pump 14L increases the rotational load, the fuel injection amount, and the exhaust pressure of the engine 11, increases the rotational speed of the turbine, and increases the rotational speed of the centrifugal compressor in this order, and eventually increases the boost pressure of the supercharger 11a. Thus, the controller 30 can increase the boost pressure of the supercharger 11a before the hydraulic load increases, and can quickly increase the boost pressure along with the increase in the hydraulic load without delay. Accordingly, the controller 30 can improve the responsiveness of a hydraulic actuator and the performance of the shovel at high altitude.

In the above embodiments, the operator turns on the switcher 50 to activate the absorbing-horsepower increasing function when the shovel is at high altitude (in a comparatively-low atmospheric pressure environment), or the shovel automatically activates the absorbing-horsepower increasing function when the atmospheric pressure is less than a predetermined pressure. Accordingly, the controller 30 can voluntarily increase the absorbing horsepower of the main pump 14 before a lever operation is performed and thereby maintain the boost pressure at a comparatively high level so that the boost pressure can be increased without delay after the lever operation is performed. This in turn makes it possible to prevent a problem such as a decrease in the engine revolution speed or an engine stop from occurring when a lever operation is performed. Also, the operator may turn on the switcher 50 to activate the absorbing-horsepower increasing function even when the shovel is not at high altitude. For example, the operator may turn on the switcher 50 to activate the absorbing-horsepower increasing function when generation of black smoke due to incomplete combustion of fuel is detected. Also in this case, the controller 30 can voluntarily increase the absorbing horsepower before a lever operation is performed and thereby maintain the boost pressure at a comparatively high level so that the boost pressure can be increased without delay after the lever operation is performed. Thus, the controller 30 can suppress or prevent the generation of black smoke.

Also in the above embodiment, the absorbing-horsepower controller 301 increases the absorbing horsepower of the main pump 14 to increase the boost pressure when the boost-pressure increase determiner 300 determines that the shovel is in the standby mode. However, during the standby mode immediately after the operation of a hydraulic actuator is stopped, the absorbing-horsepower controller 301 may be configured to not increase the absorbing horsepower of the main pump 14 until a predetermined time period passes. More specifically, the absorbing-horsepower controller 301 may be configured to not output a current command to the pressure control valve 31 until a predetermined time period passes after an operation lever corresponding to an operated hydraulic actuator returns to the neutral position. This is because the boost pressure rises and falls slowly and is still at a high level until the predetermined period passes. Also, the absorbing-horsepower controller 301 may be configured to not output a current command to the pressure control valve 31 until the output (boost pressure) of the boost pressure sensor P3 becomes lower than a predetermined value.

Also in the above embodiment, the absorbing-horsepower increasing function is implemented by using an unused valve position of a flow control value in the control valve system 17 which is already used for another purpose. Specifically, the absorbing-horsepower increasing function is implemented by using the left valve position (L) of the flow control valve 175 corresponding to the boom cylinder 7. However, the present invention is not limited to this configuration. For example, the absorbing-horsepower increasing function may be implemented by using an unused flow control valve in the control valve system 17.

Also in the above embodiment, the absorbing-horsepower controller 301 controls the pressure control valve 31 to move the flow control valve 175 and increase the discharge pressure of the main pump 14L, and thereby increases the absorbing horsepower of the main pump 14L. However, the absorbing-horsepower controller 301 may be configured to move another flow control valve by controlling the pressure control valve 31 in order to increase the discharge pressure of the main pump 14R and thereby increase the absorbing horsepower of the main pump 14R. Also, the absorbing-horsepower controller 301 may be configured to move one or more flow control valves by controlling the pressure control valve 31 to increase the discharge pressures of the main pumps 14L and 14R and increase the absorbing horsepower of the main pumps 14L and 14R at the same time.

Figure 8:
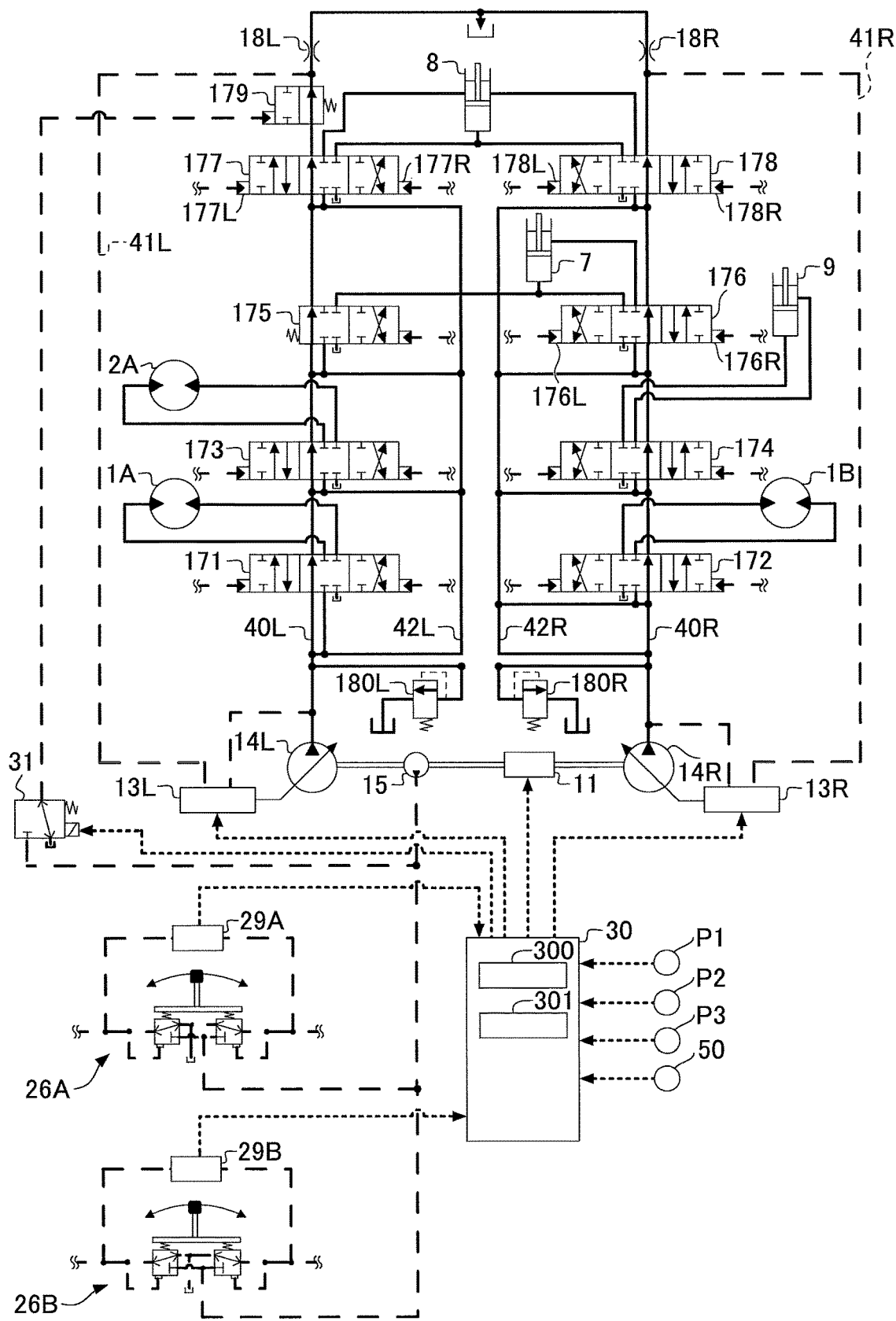
FIG. 8 is a drawing illustrating another exemplary configuration of a hydraulic system of the shovel of FIG. 1.

FIG. 8 is a drawing illustrating an exemplary configuration of a hydraulic system that includes additional flow control valves. Specifically, different from the hydraulic system of FIG. 3, the hydraulic system of FIG. 8 includes a flow control valve 175 that does not have the left valve position (L), a flow control valve 179, and relief valves 180L and 180R. Other components of the hydraulic system of FIG. 8 are substantially the same as those of the hydraulic system of FIG. 3. Accordingly, differences between these hydraulic systems are described in detail, and descriptions of the same components are omitted here.

In the present embodiment, the absorption-horsepower controller 301 introduces the hydraulic oil into a pilot port of the flow control valve 179 to move the flow control valve 179 from the right valve position toward the left valve position. The flow control valve 179 moved toward the left valve position limits the flow rate of the hydraulic oil flowing through the center bypass pipe line 40L and increases the discharge pressure of the main pump 14L.

Also in the present embodiment, the flow control valve 179 is disposed in the control valve system 17. Specifically, to be able to quickly decrease the negative control pressure, the flow control valve 179 is disposed at the most downstream position on the center bypass pipe line 40L, i.e., at a position that is downstream of the flow control valve 177 and upstream of the negative control throttle 18L. Also, the flow control valve 179 may be disposed in the control valve system 17 at a position that is upstream of one of the flow control valves 171, 173, 175, and 177. In other words, the flow control valve 179 may be disposed at a position that is downstream of one of the flow control valves 171, 173, and 175 or at a position between the flow control valve 171 and the main pump 14L. As the position of the flow control valve 179 becomes closer to the main pump 14L, the flow control valve 179 can more quickly increase the discharge pressure of the main pump 14L.

The relief valves 180L and 180R are provided to maintain the pressure of the hydraulic oil in the hydraulic system at a value less than or equal to a predetermined relief pressure. Specifically, the relief valves 180L and 180R open to discharge the hydraulic oil into the hydraulic oil tank when the pressure of the hydraulic oil in the hydraulic system becomes greater than or equal to the predetermined relief pressure. For example, the relief valve 180L opens to discharge the hydraulic oil into the hydraulic oil tank when the center bypass pipe line 40L is blocked by the flow control valve 179 and the discharge pressure of the main pump 14L becomes greater than or equal to the predetermined relief pressure.

Also in the above embodiment, the absorbing-horsepower controller 301 controls the pressure control valve 31 to move the flow control valve 175 on the center bypass pipe line 40L and increase the discharge pressure of the main pump 14L, and thereby increases the absorbing horsepower of the main pump 14L. However, the absorbing-horsepower controller 301 may be configured to move another flow control valve on the center bypass pipe line 40L by controlling the pressure control valve 31 in order to increase the discharge pressure of the main pump 14R and increase the absorbing horsepower of the main pump 14R.

Also in the above embodiment, the absorbing-horsepower controller 301 controls the pressure control valve 31 to move the flow control valve 175, which is a three-position spool valve, and to increase the discharge pressure of the main pump 14L, and thereby increases the absorbing horsepower of the main pump 14L. However, the absorbing-horsepower controller 301 may be configured to move another flow control valve, which is a four-position spool valve, by controlling the pressure control valve 31 in order to increase the discharge pressure of the main pump 14L and thereby increase the absorbing horsepower of the main pump 14L. The four-position spool valve is a flow control valve that is obtained, for example, by adding one valve position for the absorbing-horsepower increasing process to the flow control valve 171 that is a three-position spool valve.

Figure 9:
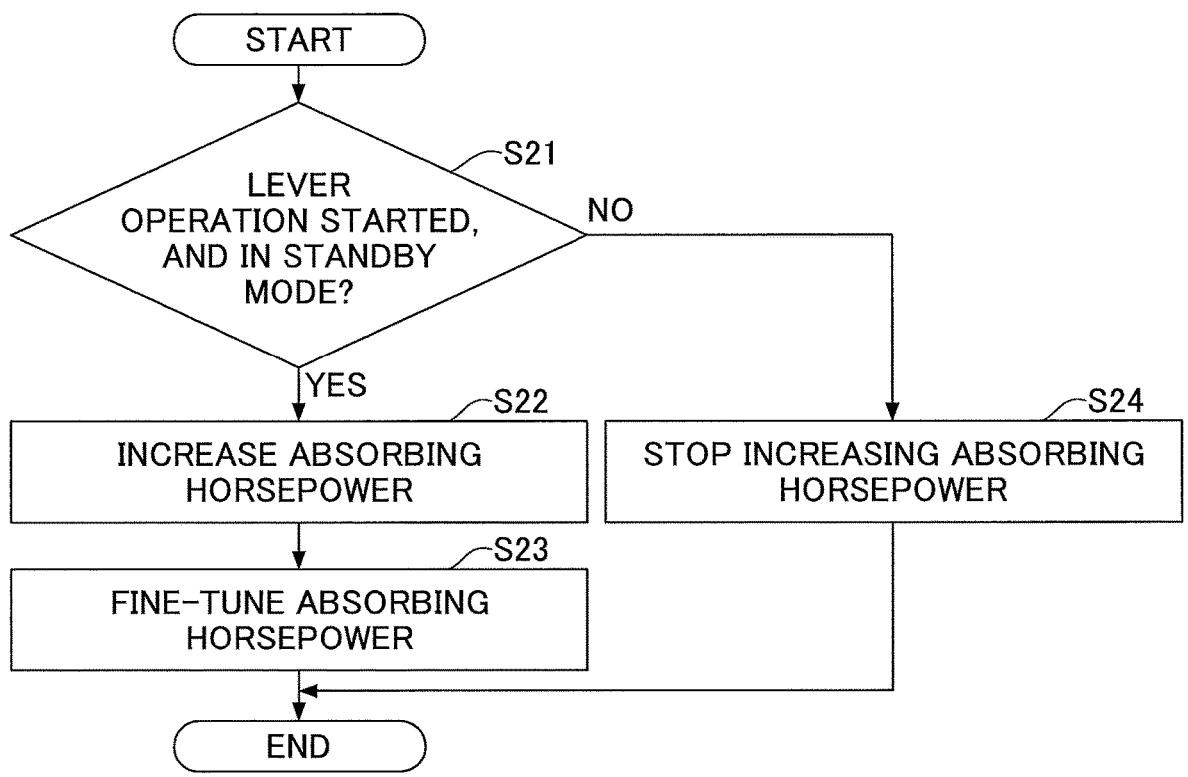
FIG. 9 is a flowchart illustrating another exemplary absorbing-horsepower increasing process.

Next, an absorbing-horsepower increasing process according to another embodiment is described with reference to FIG. 9. FIG. 9 is a flowchart illustrating another exemplary absorbing-horsepower increasing process. In the absorbing-horsepower increasing process of this embodiment, the absorbing horsepower of the main pump 14 is temporarily and voluntarily increased when a lever operation is started regardless of the level of the atmospheric pressure. For this reason, in the present embodiment, the switcher 50 is omitted, and the controller 30 can always provide the functions of the boost-pressure increase determiner 300 and the absorbing-horsepower controller 301. However, instead of omitting the switcher 50, the shovel may be configured such that the switcher 50 is always turned on.

In the absorbing-horsepower increasing process of the present embodiment, a determination condition used at step S21 is different from the determination condition used at step S1 of the absorbing-horsepower increasing process of FIG. 5. However, steps S22 through S24 are the same as steps S2 through S4 of the absorbing-horsepower increasing process of FIG. 5. Accordingly, step S21 is described in detail, and descriptions of other steps are omitted here.

At step S21, the boost-pressure increase determiner 300 determines whether it is necessary to increase the boost pressure. In the present embodiment, the boost-pressure increase determiner 300 determines whether the shovel is in the standby mode and a lever operation is started. Also in the present embodiment, the controller 30 determines whether a lever operation is started based on an output from the pressure sensor 29.

When it is determined that the above condition is satisfied (YES at step S21), the controller 30 performs steps S22 and S23 to increase and fine-tune the absorbing horsepower of the main pump 14L.

On the other hand, when it is determined that the above condition is not satisfied (NO at step S21), the controller 30 performs step S24 to stop increasing the absorbing horsepower of the main pump 14L if the absorbing horsepower is being increased. This is because when no lever operation is started, it is not necessary to voluntarily increase the boost pressure.

Thus, the controller 30 temporarily and voluntarily increases the absorbing horsepower of the main pump 14 when a lever operation is started. That is, the controller 30 increases the engine load before the load of a hydraulic actuator increases. With this configuration, the controller 30 can apply a predetermined load to the engine 11 and increase the boost pressure of the supercharger 11a even when no hydraulic load is being applied by an external force. In other words, the controller 30 can increase the boost pressure by a predetermined amount before the hydraulic load increases due to an external force without directly controlling the engine 11 and the supercharger 11a. As a result, even in a case where the hydraulic load rapidly increases due to an external force, the supercharger 11a can generate a boost pressure corresponding to the increasing hydraulic load before a problem such as a decrease in the engine revolution speed (a decrease in performance) or an engine stop occurs. When the increase in the boost pressure does not keep up with an increase in the hydraulic load (engine load) resulting from an external force, the engine 11 cannot sufficiently increase the fuel injection amount. As a result, the engine revolution speed decreases and in some cases, the engine 11 may stop without being able to increase the engine revolution speed.

Figure 10:
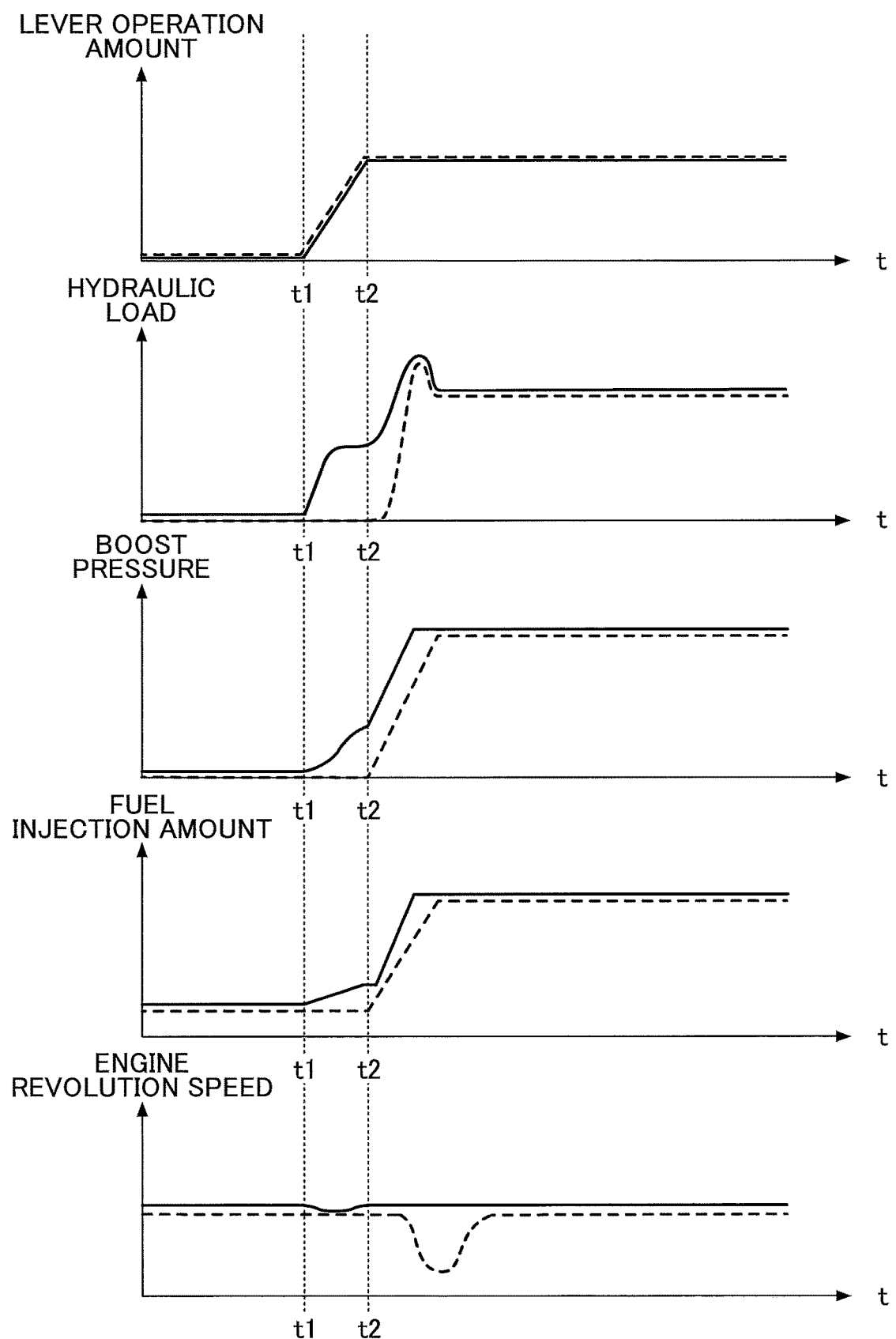
FIG. 10 is a drawing illustrating temporal changes in physical quantities observed when the absorbing-horsepower increasing process of FIG. 9 is performed.

Next, temporal changes in physical quantities, which are observed when the absorbing-horsepower increasing process of FIG. 9 is performed, are described with reference to FIG. 10. FIG. 10 is a drawing illustrating temporal changes in physical quantities including the lever operation amount, the hydraulic load (the absorbing horsepower of the main pump 14), the boost pressure, the fuel injection amount, and the engine revolution speed arranged in this order from the top. In FIG. 10, each solid line indicates a temporal change when the absorbing-horsepower increasing process of FIG. 9 is performed, and each dashed line indicates a temporal change when the absorbing-horsepower increasing process of FIG. 9 is not performed.

In FIG. 10, it is assumed that a lever operation is started at a time t1 to move, for example, the arm 5 for excavation.

First, for comparison, temporal changes in physical quantities observed when the absorbing-horsepower increasing process of FIG. 9 is not performed are described. The temporal change of the lever operation amount of the arm operation lever is the same as that in FIG. 6, and therefore its description is omitted here.

When the absorbing-horsepower increasing process of FIG. 9 is not performed, the hydraulic load (dashed line) does not increase until the time t2. Then, when the arm 5 is brought into contact with the ground at the time t2, the hydraulic load increases according to an increase in the excavation reaction force.

Also, the boost pressure (dashed line) does not increase until the time t2 and is at a comparatively low level even at the time t2. Therefore, the supercharger lie cannot increase the boost pressure along with the increase in the hydraulic load after the time t2. As a result, the engine 11 cannot sufficiently increase the fuel injection amount, cannot output sufficient engine power, cannot maintain the engine revolution speed (the dashed line), and may stop without being able to increase the engine revolution speed.

On the other hand, when the absorbing-horsepower increasing process of FIG. 9 is performed, the hydraulic load (solid line) starts to increase at the time t1 and reaches a predetermined level before the time t2. In this case, when the start of operation of the arm operation lever is detected at the time t1, the controller 30 controls the pressure control valve 31 to increase the discharge pressure of the main pump 14 for a predetermined time period before a load is applied to the corresponding hydraulic actuator. Here, the predetermined time period is a very short period (e.g., about 0.3 sec) that is sufficiently shorter that the time period between the time t1 and the time t2. Also, the controller 30 may increase the discharge rate of the main pump 14 in addition to the discharge pressure by adjusting the regulator 13. This configuration makes it possible to increase the absorbing horsepower of the main pump 14 before the discharge pressure of the main pump 14 increases due to a load applied to the arm 5. Then, as the hydraulic load corresponding to the absorbing horsepower of the main pump 14 increases, the load of the engine 11 also increases. In response, the supercharger 11a of the engine 11 increases the boost pressure to maintain the predetermined engine revolution speed. As a result, the boost pressure (solid line) starts to increase at the time t1 and reaches a predetermined level before the time t2. Therefore, even after the time t2, the supercharger 11a can increase the boost pressure along with the increase in the hydraulic load without much delay. Accordingly, the engine 11 can output sufficient engine power and maintain the engine revolution speed. Specifically, except for a slight decrease caused by the voluntary increase of the hydraulic load during a period between the time t1 and the time t2, the engine revolution speed (solid line) is maintained at a constant level.

Thus, the controller 30 voluntarily increases the hydraulic load not resulting from an external force after a lever operation is started and before the hydraulic load increases due to an external force such as an excavation reaction force. Then, the controller 30 increases the absorbing horsepower of the main pump 14 to increase the engine load and thereby indirectly causes the supercharger 11a of the engine 11 to increase the boost pressure to a comparatively high level. Accordingly, even when the hydraulic load rapidly increases due to an external force such as an excavation reaction force, the controller 30 can quickly increase the boost pressure that is already at a comparatively high level. This in turn prevents a problem such as a decrease in the engine revolution speed (a decrease in performance) or an engine stop from occurring when the boost pressure is increased.

The absorbing horsepower increasing process described with reference to FIGS. 9 and 10 may be performed by either one of the hydraulic system of FIG. 3 and the hydraulic system of FIG. 8.

A shovel and a method of controlling the shovel according to embodiments of the present invention are described above. However, the present invention is not limited to the specifically disclosed embodiments, and variations and modifications may be made without departing from the scope of the present invention.

For example, although a hydraulically-driven rotating mechanism 2 is used in the above embodiment, an electrically-driven rotating mechanism 2 may instead be used.

Also, although an application of the present invention to a hydraulic shovel is described in the above embodiments, the present invention may also be applied to a hybrid shovel where the main pump 14 is driven by the engine 11 and a motor generator connected to the main pump 14. Further, the present invention may be applied to any construction machine such as a crane, a lifting magnet crane, or an asphalt finisher that includes a supercharger, an internal combustion engine controlled at a constant revolution speed, and a hydraulic pump.

What is claimed is:

1. A method for controlling a shovel including
a lower traveling body,
an upper rotating body mounted on the lower traveling body,
an internal-combustion engine mounted on the upper rotating body and including a supercharger, the internal-combustion engine being controlled at a constant revolution speed,
a hydraulic pump coupled to the internal-combustion engine,
a hydraulic actuator to be driven by a hydraulic oil discharged from the hydraulic pump,
a control valve system including a plurality of flow control valves for controlling a flow of the hydraulic oil discharged from the hydraulic pump, each of the flow control valves being implemented by a spool valve, and
a controller that controls an absorbing horsepower of the hydraulic pump, the method comprising:
determining, by the controller, whether the shovel is in a standby mode where the hydraulic actuator is not being driven, and
upon determining that the shovel is in the standby mode, causing a specific flow control valve to limit or block the flow of the hydraulic oil before a load is applied to the hydraulic actuator so that a discharge pressure of the hydraulic pump increases and a boost pressure of the supercharger increases.

2. The method as claimed in claim 1, wherein the absorbing horsepower of the hydraulic pump is increased regardless of whether a reaction force received by an end attachment from a work object increases or decreases.

3. The method as claimed in claim 1, wherein the boost pressure of the supercharger is fine-tuned by increasing or decreasing a discharge rate of the hydraulic pump.

4. The method as claimed in claim 1,
wherein a function of the controller to increase the discharge pressure of the hydraulic pump is activated and deactivated by a switcher of the shovel.

5. The method as claimed in claim 1, wherein the specific flow control valve is disposed downstream of one of the flow control valves that is related to the hydraulic actuator.

6. The method as claimed in claim 1, wherein the specific flow control valve is disposed between the hydraulic pump and one of the flow control valves that is related to the hydraulic actuator.

7. The method as claimed in claim 1, wherein the specific flow control valve is a spool valve that operates only when a raising operation of a boom is performed and does not operate when a lowering operation of the boom is performed.

8. The method as claimed in claim 1, wherein the boost pressure of the supercharger is controlled according to an atmospheric pressure before the load applied to the hydraulic actuator increases.

* * * * *